United States Patent [19]

Takemura et al.

[11] Patent Number: 4,921,085

[45] Date of Patent: May 1, 1990

[54] ROTATIONAL SPEED DIFFERENTIAL RESPONSIVE TYPE JOINT

[75] Inventors: Toji Takemura, Yokohama; Takashi Okubo, Yokosuka, both of Japan

[73] Assignee: Nissan Motor Company, Limited, Yokohama, Japan

[21] Appl. No.: 193,628

[22] Filed: May 13, 1988

[30] Foreign Application Priority Data

May 14, 1987 [JP] Japan .................. 62-117699

[51] Int. Cl.⁵ ............................................. F16D 31/02
[52] U.S. Cl. ...................................................... 192/60
[58] Field of Search ................. 74/650, 711, 710.5, 74/730, 731, 687; 91/491; 180/248, 249; 192/60

[56] References Cited

U.S. PATENT DOCUMENTS

| | | | |
|---|---|---|---|
| 1,436,753 | 11/1922 | Carpenter | 192/60 |
| 1,836,684 | 12/1931 | Robbins | 74/650 |
| 1,840,161 | 1/1932 | Graser | 192/60 |
| 1,880,748 | 10/1932 | Bower | 192/60 |
| 2,204,261 | 6/1940 | Fraser | 192/60 |
| 2,440,975 | 5/1948 | Robbins | 74/389.5 |
| 2,595,479 | 5/1952 | Nelson | 192/60 |
| 3,198,035 | 8/1965 | Mueller | 74/650 |
| 3,368,425 | 2/1968 | Lewis | 74/720.5 |
| 3,577,803 | 5/1971 | Mueller | 74/665 |
| 3,766,804 | 10/1973 | Mori | 74/687 |
| 3,852,998 | 12/1974 | Leeson | 74/63 |
| 3,854,348 | 12/1974 | Stevenson | 74/774 |
| 4,132,297 | 1/1979 | Brown et al. | 180/248 X |
| 4,326,450 | 4/1982 | Bacquié | 91/491 X |
| 4,518,069 | 5/1985 | Elias | 192/60 |
| 4,532,854 | 8/1985 | Foster | 91/491 X |
| 4,635,535 | 1/1987 | Thoma et al. | 91/491 X |
| 4,829,769 | 5/1989 | Hiramatsu | 192/60 X |

FOREIGN PATENT DOCUMENTS

| | | | |
|---|---|---|---|
| 54-4134 | 3/1979 | Japan . | |
| 60-116529 | 6/1985 | Japan . | |
| 0626239 | 9/1978 | U.S.S.R. | 91/491 |
| 0643662 | 1/1979 | U.S.S.R. | 91/491 |

Primary Examiner—Leslie A. Braun
Assistant Examiner—Harold F. Macris
Attorney, Agent, or Firm—Foley & Lardner, Schwartz, Jeffery, Schwaab, Mack, Blumenthal & Evans

[57] ABSTRACT

A torque transmitting assembly in the form of a rotational speed differential responsive type joint is disclosed. It comprises a drive housing as a first rotary member and a rotor as a second rotary member. The second rotary member is disposed in the first rotary member. A hydraulic fluid arrangement transmits at least a portion of the input torque from one of the first and second rotary members to the other in response to a rotational speed of the second rotary member and also to a rotational speed differential occurring between the first and second rotary members. Specifically, it includes an internal cam surface formed on the first rotary member and surrounding the second rotary member, cam followers in radially outwardly opening bores formed in the second rotary member in slidable engagement with the cam surface and reciprocable in response to the rotational speed differential to define variable volume chambers in the associated radially outwardly opening bores, respectively, and a flow restricter for restricting flow of hydraulic fluid discharged from each of the associated one of the cam followers. The cam surface is contoured such that at any angular position of the second rotary member relative to the first rotary member, substantially the same ratio of the input torque is transmitted from one of the first and second rotary members to the other during the occurrence of the rotational speed differential.

9 Claims, 9 Drawing Sheets

ROTATIONAL SPEED DIFFERENTIAL RESPONSIVE TYPE JOINT

CROSS-REFERENCE TO RELATED APPLICATION

U.S. patent application Ser. No. 058,029 filed on June 4, 1987 by the applicants.

BACKGROUND OF THE INVENTION

The present invention relates to a torque transmitting assembly primarily for use as a torque transfer/split unit for use with four wheel drive vehicles, and more particularly to a rotational speed differential responsive type joint.

The above-mentioned related U.S. patent application discloses a torque transmitting assembly. This torque transmitting assembly comprises a first rotary member integral with one of an input shaft and an output shaft and formed with a cam surface at its inner peripheral wall. Inserted into the first rotary member is a second rotary member integral with the other of the input shaft and the output shaft. Carried by the second rotary member are cam bodies. The cam bodies are received in radially outwardly opening cylindrical bores formed in the second rotary members and follow the surrounding cam surface of the first rotary member during relative rotational speed differential between the first and second rotary members to reciprocate to define variable volume chambers filled with hydraulic fluid. The supply of hydraulic fluid to and the discharge thereof from each of the variable volume chambers are effected by a hydraulic circuit. The hydraulic circuit is provided with flow restrictor means for restricting flow of hydraulic fluid displaced out of each of the variable volume chambers to cause a pressure increase which biases the associated cam body into firm engagement with the cam surface. In this manner, the transmission of torque is effected via the engagement of the cam bodies with the cam surface.

This torque transmitting assembly is not satisfactory in that it induces a considerable torque variation during torque transmission at a rotational speed differential occuring between the first and second rotary members. This torque variation causes generation of noise and vibrations which are transmitted to the interior of the vehicle's cabin if the torque transmitting assembly is used in the vehicle drive train.

An object of the present invention is to improve the torque transmitting assembly of the above-mentioned type such that the torque variation occurring during relative rotational speed differential is substatially eliminated or at least minimized.

SUMMARY OF THE INVENTION

According to the present invention, there is provided a torque transmitting assembly which comprises:
a first rotary member;
a second rotary member disposed in said first rotary member; and
hydraulic fluid means for transmitting at least a portion of the input torque from one of said first rotary member and said second rotary member to the other in response to a rotational speed of said second rotary member and also to a rotational speed differential occurring between said first rotary member and said second rotary member,
said hydraulic fluid means including an internal cam surface formed on said first rotary member and surrounding said second rotary member, cam followers in radially outwardly opening bores formed in said second rotary member in slidable engagement with said cam surface and reciprocable in response to said rotational speed differential to define variable volume chambers in the associated radially outwardly opening bores, respectively, and means for restricting flow of hydraulic fluid discharged from each of said variable volume chambers on the discharge stroke of the associated one of said cam followers,
said cam surface being contoured such that at any angular position of said second rotary member relative to said first rotary member, substantially the same ratio of the input torque is transmitted from one of said first and second rotary members to the other during the occurrence of said rotational speed differential.

Preferably, said second rotary member has an axis of rotation and each of said cam followers is in slidable engagement with said cam surface at two portions which are axially spaced along said axis of rotation.

DETAILED DESCRIPTION OF THE INVENTION

Referring to the accompanying drawings, embodiments according to the present invention are described in detail. In each of the embodiments, the present invention is embodied as a rotational speed differential responsive type joint provided in a drive train of a four wheel drive vehicle of the rear engine rear drive type.

Figure 1:
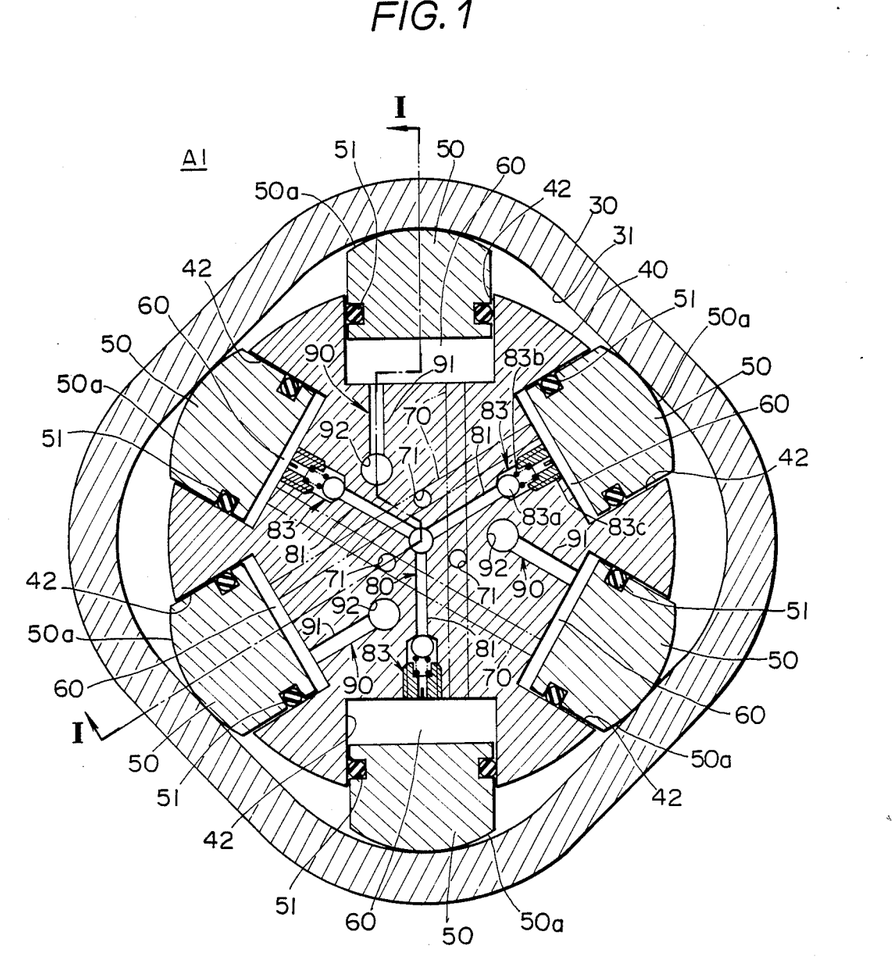
FIG. 1 is a radial section of a first embodiment of a torque transmitting assembly according to the present invention.
Figure 2:
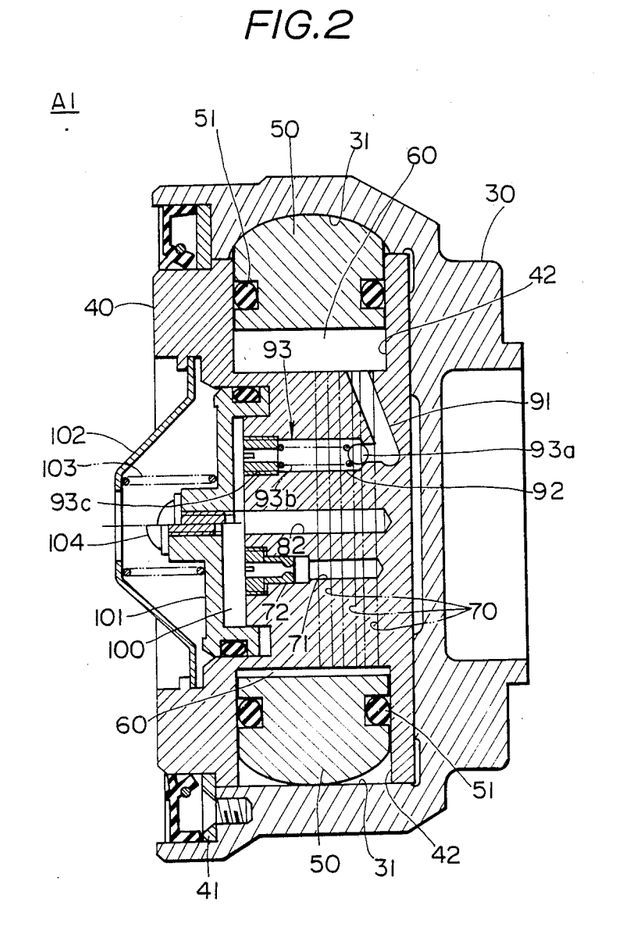
FIG. 2 is an axial section taken through the line I—I of FIG. 1.
Figure 3:
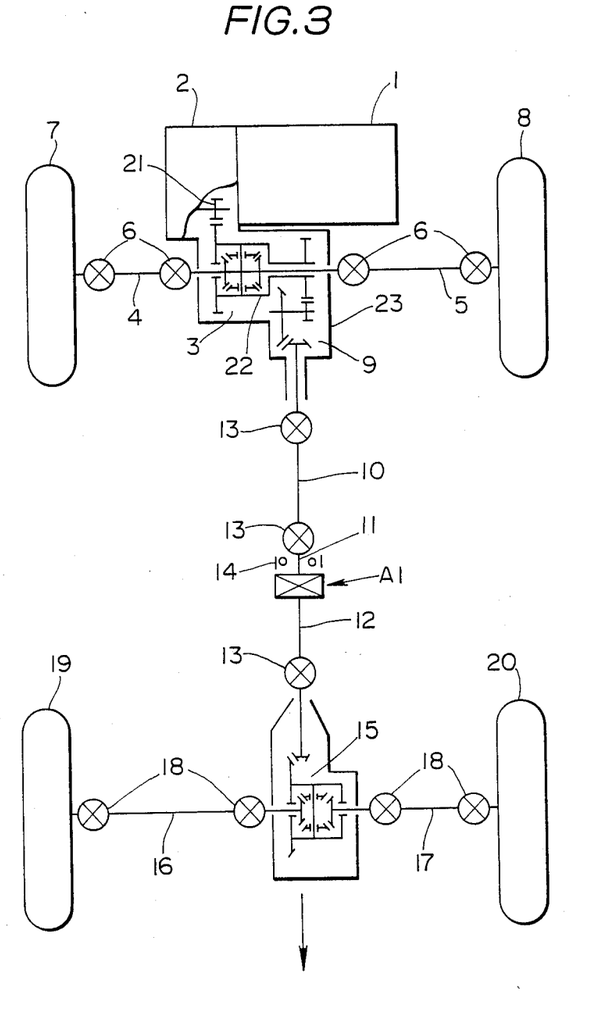
FIG. 3 is a schematic top plan view of a four wheel drive vehicle containing the first embodiment of the present invention.

Referring to FIGS. 1 to 3, the construction of the first embodiment of a rotational speed differential responsive type joint A1 is described.

As shown in FIG. 3, the rotational speed differential responsive type joint A1 is provided in a front wheel drive system of a four wheel drive automotive vehicle employing a rear drive as a base. It is used as a center differential and a torque split system for transfer of torque to front wheels.

Regarding the drive systems of the four wheel drive vehicle which the first embodiment of the joint A1 is applied to, the rear wheel drive system comprises a rear mount engine 1, a transmission (including a clutch) 2, a rear differential 3, rear drive shafts 4, 5, rear drive shaft joints 6, and rear wheels 7, 8, whereas the front wheel drive system comprises a transfer gear train 9, a first universal joint 13, a rear propeller shaft 10, a second universal joint 13 a center propeller shaft 11, the above-mentioned rotational speed differential responsive type joint A1, a front propeller shaft 12, a third universal joint 13, a center bearing 14, a front differential 15, front drive shafts 16, 17, front drive shaft joints 18, and front wheels 19, 20. The center propeller shaft 11 and front propeller shaft 12 serve as an input shaft to and an output shaft from the rotational speed differential responsive type joint A1, respectively.

The construction of the rotational speed differential responsive type joint A1 is explained.

As shown in FIGS. 1 and 2, the first embodiment of the rotational speed differential responsive type joint A1 comprises a first rotary member in the form of a drive housing 30, a second rotary member in the form of a rotor 40, cam bodies in the form of driving pistons 50, radially outwardly opening bores in the form of cylindrical bores 42, variable volume hydraulic fluid chambers in the form of cylindrical chambers 60, balance passages 70, regulator passages 80, relief passages 90, and an accumulator chamber 100.

The drive housing 30 is fixedly secured to the input shaft in the form of the center propeller shaft 11 by means of bolts. Formed in the inner peripheral wall of the drive housing 30 is an internal cam surface 31. The cam surface 32 is contoured such that at any angular position of the rotor 40 relative to the drive housing 30, substantially the same ratio of the input torque is transmitted from the rotor 40 to the drive housing 30 upon occurrence of a rotational speed differential between the rotor 40 and drive housing 30. In other words, the contour of the cam surface 31 is such that the total of torque T transmitted from one to the other of the first and second rotary members during relative rotational speed differential at one angular position $\theta$ of any two angular positions formed by the first and second rotary members is substantially the same as the total during relative rotational speed differential at the other angular position formed by the first and second rotary members.

The rotor 40 is disposed in the drive housing 30 and surrounded by the cam surface 31. The rotor 40 is fixedly secured to the output shaft in the form of the front propeller shaft 12 by means of bolts. Axial movement of the rotor 40 relative to the drive housing 30 is prevented by a stop plate 41 (see FIG. 2) secured to the drive housing 30 by means of screws even though relative rotational movement is permitted. As best seen in FIG. 1, the rotor 40 is formed with six such radially outwardly opening cylindrical bores 42 having one ends opening and opposed to the cam surface 31. These cylindrical bores 42 have their opening ends positioned equi-angularly distant one after another.

The driving pistons 50 are slidably disposed in the associated cylindrical bores 42, respectively, in a fluid tight manner with seal rings 51. Each of the driving pistons 50 has a spherical rounded top 50a in sliding engagement with the cam surface 31. The radius of curvature of each of the rounded top ends 50a is set longer than the radius of a driving ball which would slidably fit in the associated cylindrical bore 42 although it is set shorter than the radius of curvature of any portion of the cam surface 31. This setting is effective for increased structural strength to high torque transmission.

The variable volume cylindrical chambers 60 are defined in the cylindrical bores 42 by the associated driving pistons 50, respectively. Each of the cylindrical chambers 60 is subject to a volume change as the associated driving piston 50 strokes.

The three balance passages 70 are formed in the rotor 40, each interconnecting cylindrical chambers 60 of the same phase during reciprocal stroke of the driving pistons 50. They have axial branch passages 71, respectively, which lead to the accumulator chamber 100. As best seen in FIG. 2, an orifice 72 is provided in each of the axial passages 71.

The regulator passage 80 is provided to establish communication between the accumulator chamber 100 and every other one of the cylindrical chambers 60, and it comprises a central axis passage 82 and three radial passages 81 extending radially from the central axial passage 82. Provided in each of the radial passages 81 is a one-way valve 82 which includes a ball and arranged to permit one-way flow of hydraulic fluid to the associated cylindrical chamber 60 from the accumulator chamber 100 only. The one-way valves 83 include a valve ball 83a, a valve spring 83b and a valve retainer 83c.

The relief passages 90 are provided to establish communication between the accumulator chamber 100 and every other one of the cylindrical chambers 60 which do not communicate with the radial passages 81 of the regulator passages 80. The relief passages 90 include three axial passages 92 and three radial passages 91 extending radially from the axis passages 92, respectively. As best seen in FIG. 2, provided in each of the axial passages 92 is a relief valve 93 of the ball valve type. The relief valves 93 comprise a valve ball 93a, a valve spring 93b and a valve retainer 93c.

The accumulator chamber 100 is variable to absorb a change in volume of hydraulic fluid contained in the cylindrical chambers 60, balance passages 70, regulator passage 80 and relief passages 90. The accumulator chamber 100 is defined by an accumulator piston 101 which is slidably supported by the rotor 40 in fluid tight manner for axial reciprocal movement relative to the rotor 40. The accumulator piston 101 is biased by a coil spring 103 operatively disposed between the accumulator piston 101 and a spring retainer 102. Provided at the central portion of the accumulator piston 101 is a seal plug 104 for removal of air and hydraulic fluid. With this seal plug 104, the air and hydraulic fluid removal work can be done with a short time while preventing imbalance of rotation of the rotor 40.

The contour of the cam surface 31 as viewed in FIG. 1 is hereinafter described.

Figure 4:
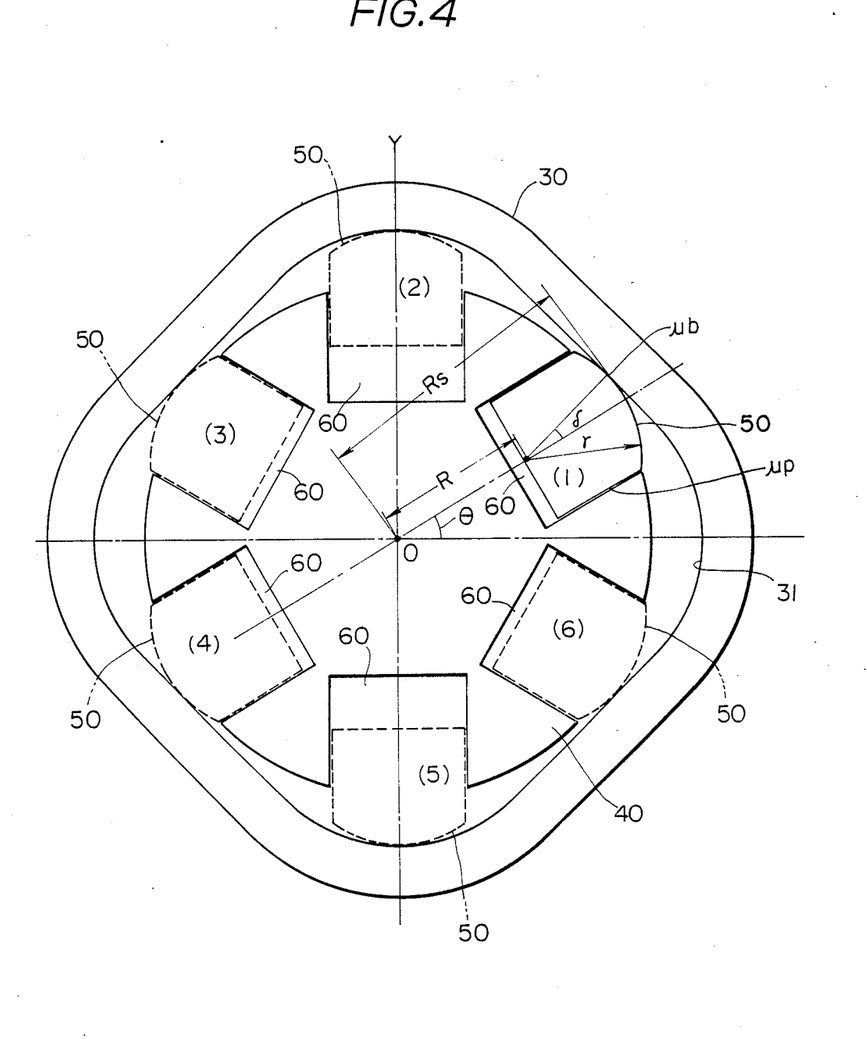
FIG. 4 is a diagram used to explain various parameters in determining the contour of a cam surface.

Reference numerals used in FIG. 4 and in each of the following equations are defined as;

$\theta$: The angle through which the rotor 40 rotates relative to the drive housing 30;

R: The distance between the axis of rotation O and the center of radius of curvature of the rounded top end 50a of the driving piston 50;

r: The radius of curvature of the rounded top end 50a of the driving piston 50;

$R_S$: The distance between the axis of rotation O and the contact point at which the driving piston 50 engages with the cam surface 31 when the rotor 40 assumes the angular position $\theta$ relative to the drive housing;

$\delta$: The angle formed between the extension of the line segment interconnecting the axis of rotation O and the center of radius of curvature of the the rounded top end 50a of the driving piston 50 and the line segment interconnecting the center of radius of curvature of the driving piston 50 and the contact portion at which the driving piston 50 slidably engages with the cam surface 31;

$\mu p$: The friction coefficient between the cylindrical wall of the bore 42 and the driving piston 50 slidably received therein;

$\mu b$: The friction coefficient between the cam surface 31 and the driving piston 50; and k: Constant.

Referring to FIG. 4, using the polar cordinates, the distance R, i.e., the length of the line segment interconnecting the center of radius of curvature of the rounded top end 50a of the driving piston 50 and the center of axis of rotation O can be expressed as a function of the angle $\theta$ by the equation, $$R = f_1(\theta).$$

Thus, the curve of the cam surface 31 is given by the envelope of a family of curves given by the above equation.

$R_S$ and $\delta$ can be expressed as functions of $\theta$ and r by the equations, $$R_S = f_2(\theta, r),$$

and $$\delta = f_3(\theta, r).$$

Let us now assume that the rotor 40 rotates relative to the drive housing 30 at an angular speed as expressed by the equation $\theta = f_4(t)$. If R is subject to a change $\Delta R$ (delta R) during a little period of time $\Delta t$ (delta t), the torque $T_\theta$ generated by the driving piston 50 fully drawn in FIG. 4 can be expressed by the equation, $$T_\theta = R_{S\theta} \cdot f_\theta(\delta, \mu b, \mu p) \cdot \left(\frac{\Delta R}{\Delta t}\right)^2_\theta \cdot k.$$

where, $R_{S\theta}$: The distance $R_S$ when the rotor 40 assumes the angular position $\theta$ relative to the drive housing 30;

$f_\theta(\delta, \mu b, \mu p)$: The ratio at which a force biasing the driving piston 50 in the radial direction is converted at the contact point at which the driving piston 50 engages with the cam surface 30 to a force in the rotational direction of the rotor 40 relative to the drive housing 30;

$$\left(\frac{\Delta R}{\Delta t}\right)^2_\theta \cdot k:$$

The force biasing the driving piston 50 radially outwardly. This term means that this force which results from a pressure increase in the cylindrical chamber 60 due to the throttling effect of the orifice 72 is proportional to the square of the stroke speed of the driving piston 50.

Figure 5:
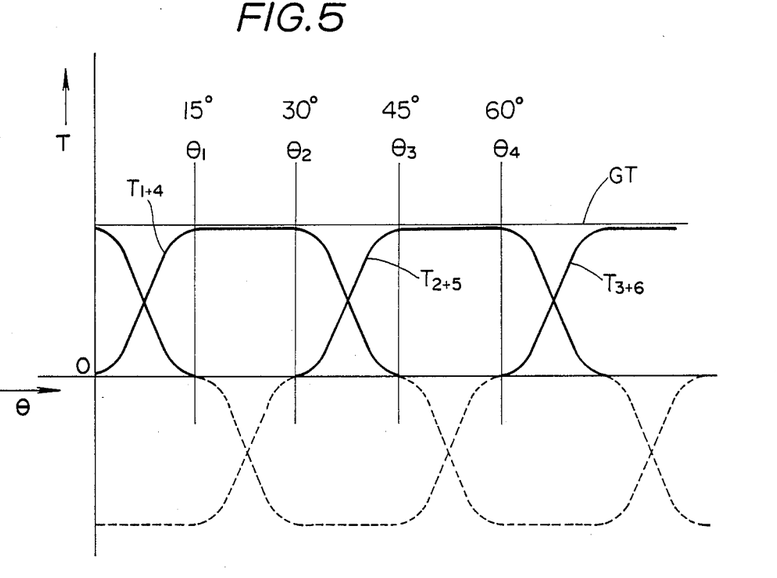
FIG. 5 shows torque characteristic curves.

Referring to FIG. 5, the torque characteristic is described. In this Figure, the axis of ordinates and the axis of abcissas represent the torque T and the angle $\theta$, respectively. The curve $T_{1+4}$ shows the total of torques generated by a pair of diametrically opposed driving pistons 50(1) and 50(2), the curve $T_{2+5}$ shows the total of torques generated by a second pair of diametrically opposed driving pistons 50(2) and 50(5), and the curve $T_{3+6}$ shows the total of torques generated by a third pair of diameterically opposed driving pistons 50(3) and 50(6).

During a phase from 0 to $\theta_1$, the torque $T_{1+4}$ is increasing, while the torque $T_{3+6}$ is decreasing. These curves $T_{1+4}$ and $T_{3+6}$ vary in such a smooth manner as to keep the grand total GT of torques at a predetermined constant value.

During the next subsequent phase from $\theta_1$ to $\theta_2$, all torque is to be transmitted via the pair of driving pistons 50(1) and 50(4). Since in this embodiment the torque transmitted via the driving piston 50(1) is equal to that transmitted via the driving piston 50(4), each of the driving pistons 50(1) and 50(4) transmits a constant torque represents by GT/2, where GT is equal to the predetermined constant value.

The torque curve drawn during the phase from $\theta_1$ to $\theta_2$ approximates the line expressed by the equation $R = A_0 - a \cdot \theta$ ($A_0$, a ... constants, respectively). The equation that $$T_\theta = R_{S\theta} \cdot f_\theta(\delta, \mu b, \mu p) \cdot \left(\frac{\Delta R}{\Delta t}\right)^2_\theta \cdot k.$$

is differentiated with respect to time t. The result of this differential operation shows that $T_\theta$ decreases in proportion to a decrease in $R_S$ since a change in the second term of the above equation is negbigible and the third term thereof is constant. Thus, it will be understood that the equation to keep the grand total GT at the predetermined constant value during this phase $\theta_1$ to $\theta_2$ is given by adding a correction term that is determined taking the above into account to the equation $R = A_0 - a \cdot \theta$. The solution to the above-mentioned equation to keep the grand total GT at the predetermined constant value is given by approximation operation performed by a computer.

During the phase from $\theta_2$ to $\theta_3$, the torque $T_{1+4}$ decreases and the torque $T_{2+5}$ increases in such a smooth manner as to keep the grand total GT at the predetermined constant value.

During the phase from $\theta_3$ to $\theta_4$, all torque is transmitted via the pair of diametrically opposed driving pistons 50(2) and 50(5) like the driving pistons 50(1) and 50(4) during the presious phase from $\theta_1$ to $\theta_2$.

As will be readily understood from the torque characteristic curve $T_{1+4}$, the torques transmitted via the pair of diametrically opposed driving pistons 50(1) and 50(4) have been studied during torque transmitting phase (from 0 to $\theta_3$) where R and $R_S$ decrease as $\theta$ increases, while during the phase from $\theta_3$ where R and $R_S$ increases as $\theta$ increases further from $\theta_3$, there is no torque transmitted via these driving pistons because these pistons are subject to hydraulic fluid induction stroke.

The contour of the cam surface 31 is expressed by the following equations. In the following equations, RT indicates a radial distance from the center of axis of rotation O to any point on the cam surface 31, and A, B, C and D are constants.

$$0° = \theta \leq 15°$$

$$RT = (A - 15° \times B \div 45°) + (C \times 15° \times B \div 45°) \times \sin(6\theta + 90°) + D \times \sin 24\theta$$

$$15° = \theta < 30°$$

$$RT = A - B\theta \div 45°$$

$$30° = \theta < 45°$$

$$RT = (A - 30° \times B \div 45°) + (C \times 15° \times B \div 45°) \times \sin 6\theta + D \times \sin 24\theta$$

$$45° = \theta < 60°$$

$$RT = (A - 30° \times B \div 45°) + (C \times 15° \times B \div 45°) \times \sin 6\theta + D \times \sin(24\theta + 180°)$$

$$60° = \theta < 75°$$

$$RT = A - 2 \times 45° \times B \div 45° + B \div 45°$$

$$75° \leq \theta < 90°$$

$$RT = (A - 15° \times B \div 45°) + (C \times 15° \times B \div 45°) \times \sin(6\theta - 90°) + D \times \sin(24\theta + 180°).$$

The calculation of the above equations is repeated three times to give the contour of the cam surface 31 from 90° to 360°.

The operation of the first embodiment of the joint A1 as being installed in the four wheel drive as shown in FIG. 3 is explained.

Figure 6:
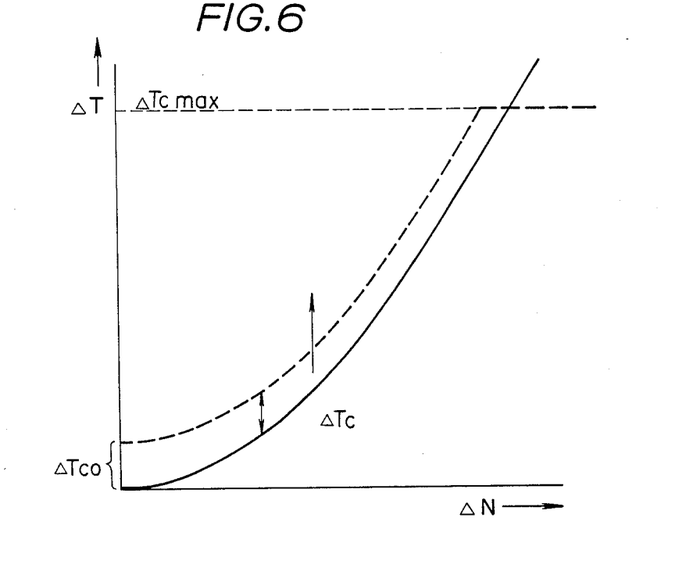
FIG. 6 shows a torque transmission characteristic by the first embodiment.

(A) In the case where there is no rotational speed differential, viz., $\Delta N = 0$:

In its operating condition where there is no relative rotation $\Delta N$ (delta N), the driving pistons 50 will not reciprocate. Since the driving pistons 50 are thrown radially outwardly due to centrifugal force as the drive housing 30 rotates, the rounded top faces of the driving pistons 50 increase their engagement with the cam surface 31 as the speed of rotation of the drive housing 30 increases. The centrifugal force increases in proportion to the square of the speed V of rotation of the rotor 40, so that the transmission of torque from the rotor 40 to the drive housing member 30, viz., $\Delta Tco$ (delta Tco), increases in proportion to the square of the speed v of rotation of the rotor 40, as shown in FIG. 6. The transmission of torque $\Delta Tco$ to the drive housing 30 and then to the front propeller shaft 12 connecting to the front wheels 19, 20 occurs when the vehicle runs at high speeds. The stability at high speed running is thus increased.

As will now be understood, the vehicle acts as a two wheel drive vehicle when it runs substantially straight on a dry road at low or intermediate speeds, whereas it acts as a four wheel drive vehicle when it runs substantially straight at high speeds.

(B) In the case where there occurs a rotational speed differential, viz., $\Delta N$ being greater than 0:

In its operating condition where a rotational speed differential $\Delta N$ (delta N) occurs between the rotor 40 and the drive housing 30, the driving pistons 50 reciprocate to provide a pumping action. To permit hydraulic fluid to be displaced from a pair of diametrically opposed cylindrical chambers 60 on the discharge strokes of the driving pistons 50, the pair of the cylindrical chambers 60 are in communication with the accumulator chamber 100 via the balance passage 70 and the common orifice 72 provided in the axial passage 71. To replenish the hydraulic fluid from the accumulator chamber 100 to another pair of diametrically opposed cylindrical chambers 60 on the suction strokes of the driving pistons 50, the regulator passages 81, 82 allow a one-way flow of hydraulic fluid from the accumulator chamber 100 to another pair of diametrically opposed cylindrical chambers 60. When such reciprocation occurs, the hydraulic fluid can be discharged from each cylindrical chamber 60 on the discharge stroke of the associated driving piston 50 at a rate controlled by the orifice 72. The transmission of torque from the rotor 40 to the drive housing 30, viz., $\Delta T$ (delta T), is determined by the algebraic sum of forces with which the driving pistons 50 are urged to engage the cam surface 31. Each force is the product of the effective pressure acting area of each driving piston 50 and the pressure of hydraulic fluid within the associated cylindrical chamber 60. The pressure of the hydraulic fluid within each cylindrical chamber 60 is determined by the pressure drop created across the associated orifice 72. The pressure drop becomes great as the rotational speed differential $\Delta N$ (delta N) increases. Thus, the greater the amount of the rotational speed differential $\Delta N$ (delta N), the greater will be the transmission of torque $\Delta T$ (delta T) that is transmitted to the front propeller shaft 12 and then to the front wheels 19, 20. The fully drawn curve shown in FIG. 6 illustrates the characteristic of $\Delta T$ versus $\Delta N$. As described before, the greater the vehicle speed V, the greater will be the transmission of torque $\Delta Tco$. Thus, the actual transmission of torque to the front wheels 19, 20 is the sum of $\Delta T$ and $\Delta Tco$. The broken line curve shown in FIG. 6 illustrates the characteristic of this actual transmission of torque when the vehicle speed V is fixed at a certain value. Therefore, the extent of transmission of torque to the front wheels 19, 20 is variable in response to the rotational speed differential $\Delta N$ and vehicle speed V.

It will now be recognized that, when the rear wheels 7, 8 have lost their traction and are slipping, the vehicle shifts from the two wheel drive state to the four wheel drive state in accordance with the extent to which the rear wheels 7, 8 slip. As a result, the start-up performance and the acceleration performance of the vehicle have been enhanced. The travelling performance of the vehicle on passing through area covered with rain or snow has been enhanced. Besides, even if the rear wheels 7, 8 have lost traction when passing through muddy terrain, the torque will be transmitted to the front wheels 19, 20, so that the ability of the vehicle to pass through such rough terrain has been improved.

It will also be recognized that although a small rotational speed differential $\Delta N$ occurs when the vehicle turns a corner at a low vehicle speed, since the transmission of torque to the front wheels 19, 20 is small under this condition, so called tight corner braking phenomena will not take place. Under this operating condition, the rotational speed differential speed responsive joint A1 absorbs the rotational speed differential and thus acts as a center differential.

However, when the vehicle turns a corner at a high vehicle speed, a relatively large rotational speed differential $\Delta N$ (delta N) occurs, so that the transmission of torque to the front wheel 19, 20 is large under this condition. Thus, under this condition, the four wheel drive state with relatively large transmission of torque $\Delta T$ (delta T) is accomplished. Since the drive is distributed to the four wheels, the limit vehicle velocity upon turning a corner increases. Thus, the performance of the vehicle upon negotiating with a corner improves.

Figure 7:
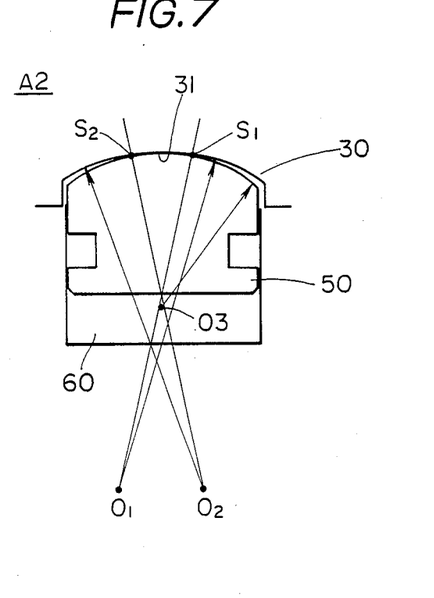
FIG. 7 is a fragmentary sectional diagram of a second embodiment of a torque transmitting assembly.

The second embodiment is described with reference to FIG. 7. FIG. 7 is a diagrammatic section taken through a rotational speed differential responsive type joint A2 along an axial plane including the axis of rotation O (ref. FIG. 4) and the contact portion where a cam surface 31 engages with a driving piston 50.

The second embodiment of the joint A2 is substantially the same as the first embodiment of the joint A1 except the fact that, as shown in FIG. 7, the cam surface 31 contacts with each driving piston 50 at two points $S_1$ and $S_2$ spaced axially along the axis of rotation O of the rotor 40 relative to the drive housing 30.

As shown in FIG. 7, the driving piston 50 has a cross section taken through an radial plane including the axis of rotation O, which cross section has a spherical rounded top end with an arc of a single having a center $O_3$, while the cross sectional contour of the cam surface 31 taken through this axial plane consists of two circular arcs connecting smoothly to each other, one circle having a center $O_1$ disposed on the axis of rotation O, the other circle having a center $O_2$ disposed on the axis of rotation O. These centers of circles $O_1$ and $O_2$ are spaced along the axis of rotation O. Thus, the two circular arcs of the cam surface 31 engage with the circular arc of the spherical rounded top end of the driving piston 50 at two contact points $S_1$ and $S_2$.

Figure 8:
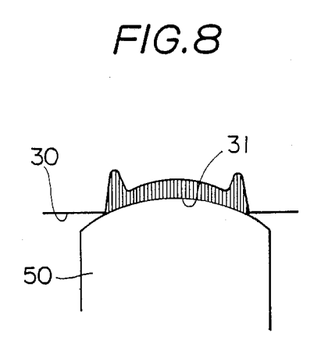
FIG. 8 shows a stress ellipsoid in the case of a single contact.

In forming the cam surface and the driving piston spherical rounded top end along circular arcs having the common center, it is necessary to reduce a difference between the radii of the circular arcs in order to prevent local concentration of stress during transmission of torque by the joint. However, even with a little difference between the radii of the circular arcs, the stress ellipsoid differs considerably. In this case, there occur two stress peaks at edge portions of the driving piston as shown in FIG. 8. This causes a surface bugging phenomena whereby the surfaces are considerably damaged.

Figure 9:
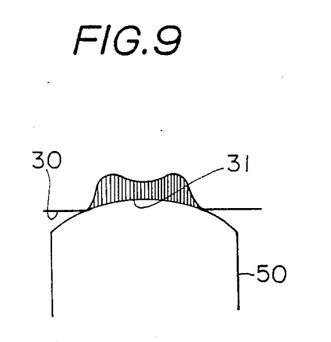
FIG. 9 shows a stress ellipsoid in the case of a two-point contact.

With the second embodiment where the surfaces engage with each other at two contact points $S_1$ and $S_2$, the stress ellipsoid as shown in FIG. 9 can be illustrated. As will be readily understood from this stress ellipsoid, there is no local concentration of stress because the stress is evenly distributed over extended contacting area. The overall size of the joint therefore can be decreased. Besides, the degree of precision with which manufacturing of circular arcs of the cam surface 31 and the rounded top end of the driving piston may be lowered.

With the engagement at two contact points $S_1$ and $S_2$, the transmission of torque is effected via different new area portions of the cam surface 31 during rotation of the rotor relative to the drive housing 30 so that the rounded top end of each driving piston 50 is subject to even wear.

Figure 10:
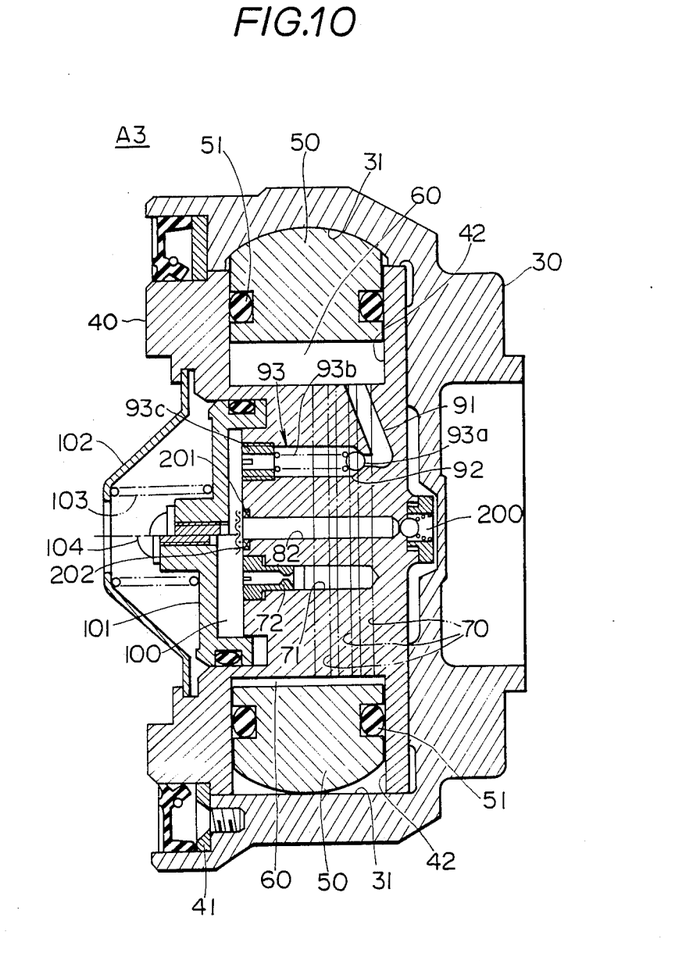
FIG. 10 is a similar view to FIG. 12 showing a third embodiment of a torque transmitting assembly.

The third embodiment of a rotational speed differential responsive type joint A3 is described with reference to FIG. 10.

Comparing this Figure with FIG. 2, it will be understood that the third embodiment is different from the first embodiment only in that a check valve 200 is provided and a filter 201 with a fine mesh, for example, a 5 microns mesh, is provided upstream of the check valve 200. Specifically, the filter 201 is attached to a rotor 40 by a stop ring 202 in a manner to close the open end of axial passage 82 forming a part of regulator passage means. With this filter, fiber and/or metal dusts entrained in hydraulic fluid can be completely prevented from entering the hydraulic circuit formed in the rotor 40. Thus, normal function of the check valve 200 is always assured.

The fourth embodiment of a rotational speed differential responsive type joint A4 is described with reference to FIGS. 11 and 12.

Figure 11:
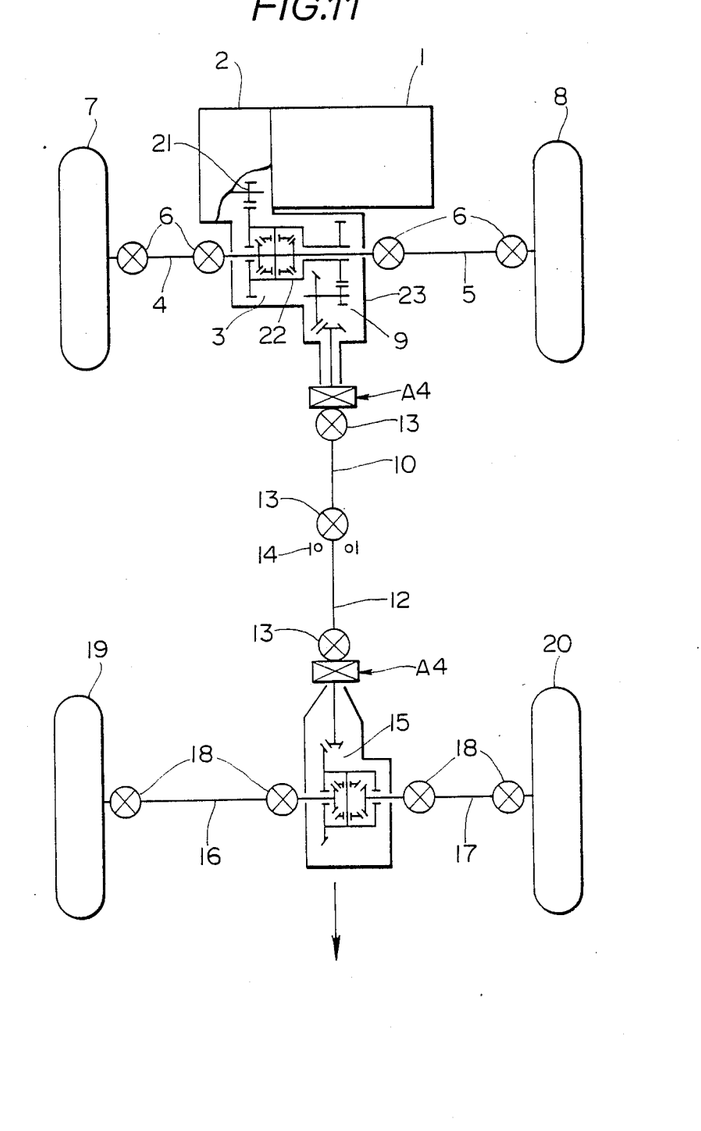
FIG. 11 is a similar view to FIG. 3 showing a four wheel drive vehicle containing a fourth embodiment of a torque transmitting assembly according to the present invention.
Figure 12:
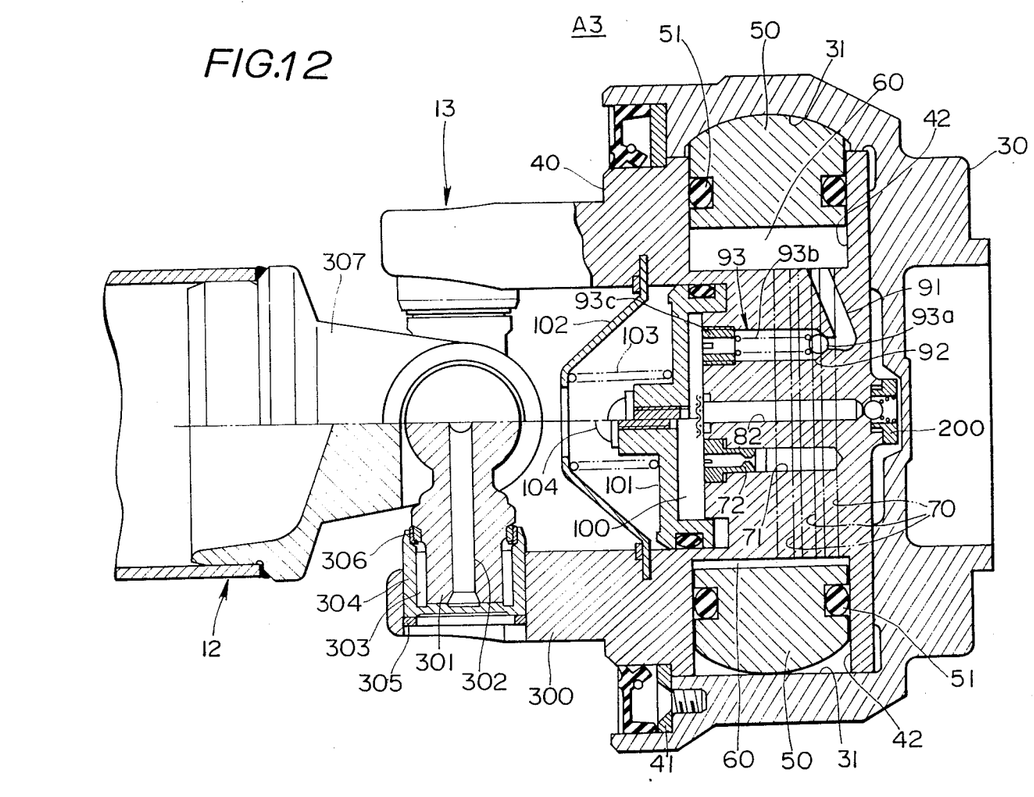
FIG. 12 is an axial section of the fourth embodiment.

Comparing FIG. 11 with FIG. 3, it will be noted that the joint A4 is integral with a universal joint 13 as different from the joint A1 which is separate from the unversal joint 13. Referring to FIG. 12, a rotor 40 is formed integral with a yoke 300 forming a part of the universal joint 13 which includes a spider 301 and a ball yoke 307 fixed to a front propeller shaft 12. Comparing FIG. 12 with FIG. 10, it will be noted that the joint A4 is substantiallyn the same as the joint A3 shown in FIG. 10 except that the rotor 40 is formed integral with the yoke 300 of the unversal joint 13. In FIG. 12, the reference numeral 302 designates a hydraulic fluid groove, 303 a needle bearing, 304 a bearing face, 305 a snap ring, and 306 an oil seal.

According to this fourth embodiment of the joint A4, the rotor 40 is formed integral with the universal joint 13, unnecessiating the use of a flange and bolts which are required when a separate universal joint is installed. This results in a reduction in the number of steps for the installation. Besides, the amount of imbalance at each coupling is reduced, resulting in a considerable reduction in the noise level in the vehicle's cabin and vibration which are caused by the installation imbalance of the propeller shafts 10 and 12.

If it is a separate piece, a flange of a universal joint covers one end of the rotational speed differential responsive type joint A4 in such a manner as to prevent cooling of the joint A4 with outside air. However, according to the fourth embodiment of the joint A4, the joint A4 is directly exposed to outside air and thus high cooling effect is expected.

In each of the above embodiments, the rotational speed differential responsive type joint is described as being installed in the front wheel side propeller shaft of the four wheel drive vehicle of the rear engine rear drive type. The joint according to the present invention may be installed in a front side propeller shaft of a four wheel drive vehicle of the front engine front drive type.

What is claimed is:

1. A torque transmitting assembly, comprising:
   a first rotary member;
   a second rotary member disposed in said first rotary member; and
   hydraulic fluid means for transmitting at least a portion of the input torque from one of said first rotary member and said second rotary member to the other in response to a rotational speed of said second rotary member and also to a rotational speed differential occurring between said first rotary member and said second rotary member,
   said hydraulic fluid means including an internal cam surface formed on said first rotary member and surrounding said second rotary member, cam followers in radially outwardly opening bores formed in said second rotary member in slidable direct contact engagement with said cam surface and reciprocable in response to said rotational speed differential to define variable volume chambers in the associated radially outwardly opening bores, respectively, and means for restricting flow of hydraulic fluid discharged from each of said variable volume chambers on the discharge stroke of the associated one of said cam followers for transmitting torque through said direct contact between said cam followers and said cam surface, said cam surface being contoured such that at any angular position of said second rotary member relative to said first rotary member, substantially the same ratio of the input torque is transmitted through said cam followers and cam surface from one of said first and second rotary members to the other during the occurrence of said rotational speed differential.

2. A torque transmitting assembly as claimed in claim 1, wherein said second rotary member has an axis of rotation and each of said cam followers is in slidable engagement with said cam surface at two portions which are axially spaced along said axis of rotation.

3. A torque transmitting assembly as claimed in claim 2, wherein each of said cam followers is in the form of a driving piston having a spherical rounded top end in slidable engagement with said cam surface, and said cam surface has an axial cross sectional profile contoured by two arcs of circles having centers thereof disposed on said axis of rotation and spaced axially along said axis of rotation.

4. A torque transmitting assembly as claimed in claim 1, wherein said first rotary member is in the form of a drive housing and said second rotary member includes a rotor.

5. A torque transmitting assembly as claimed in claim 4, wherein said hydraulic fluid means include regulator passage means formed through said rotor for replenishing hydraulic fluid to each of said variable volume chambers on the induction stroke of the associated one of said cam followers.

6. A torque transmitting assembly as claimed in claim 5, wherein said flow restricting means include balance passages formed through said rotor and orifice means provided in said balance passages.

7. A torque transmitting assembly as claimed in claim 5, wherein said hydraulic fluid means include an accumulator attached to said rotor, said accumulator including an accumulator piston defining a variable volume accumulator chamber between said accumulator chamber and said rotor, which accumulator chamber is in fluid communication with said regulator passage means and said balance passages.

8. A torque transmitting assembly as claimed in claim 7, wherein there is provided filter means for preventing entry of foreign products entrained in hydraulic fluid into said regulator passage means.

9. A torque transmitting assembly as claimed in claim 4, wherein said second rotary member includes a component part of a universal joint, said component part being formed integral with said rotor.

* * * * *